May 23, 1950 A. J. TACCHELLA 2,508,435
FREEZING MACHINE
Filed April 6, 1945 3 Sheets-Sheet 1

INVENTOR.
ANDREW J. TACCHELLA
BY
ATTORNEY

May 23, 1950 — A. J. TACCHELLA — 2,508,435
FREEZING MACHINE
Filed April 6, 1945 — 3 Sheets-Sheet 2
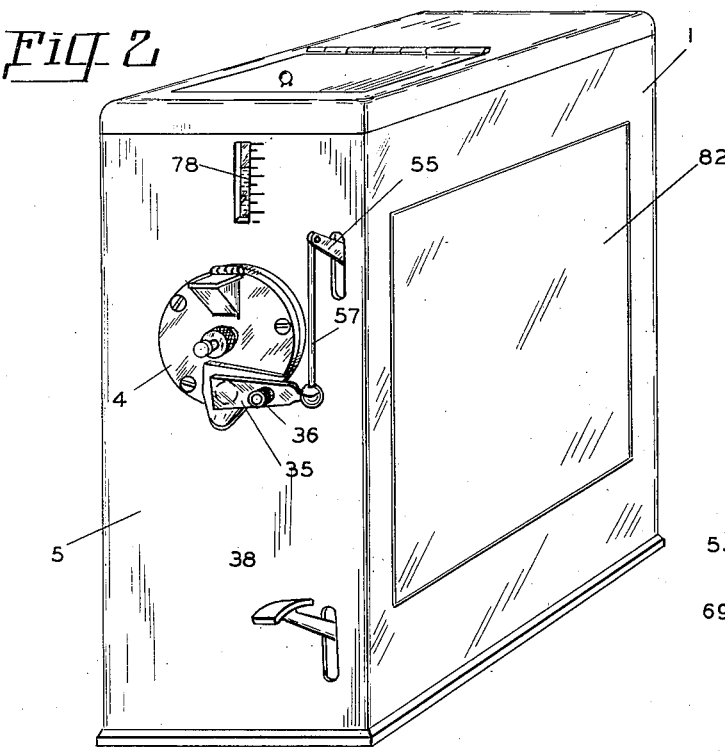
Fig. 2
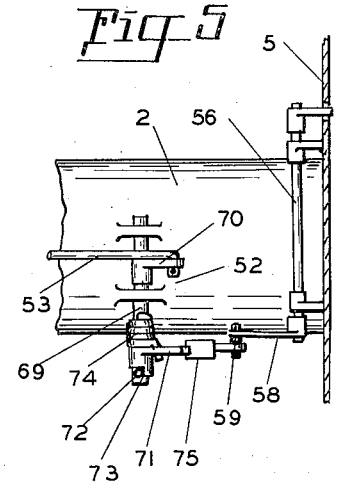
Fig. 5
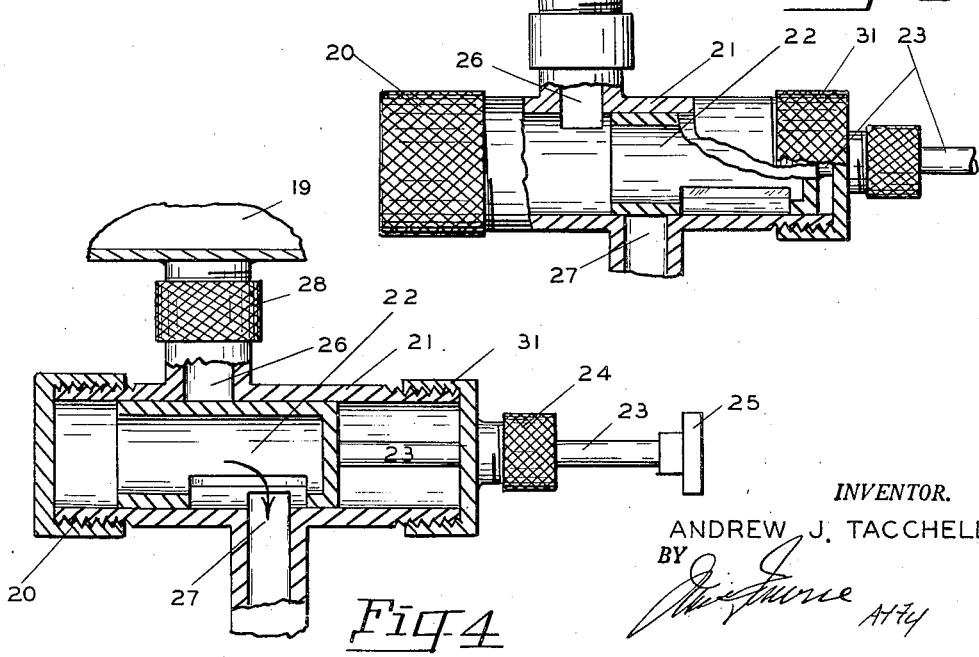
Fig. 3
Fig. 4
INVENTOR.
ANDREW J. TACCHELLA
BY May 23, 1950     A. J. TACCHELLA     2,508,435
FREEZING MACHINE
Filed April 6, 1945                         3 Sheets-Sheet 3
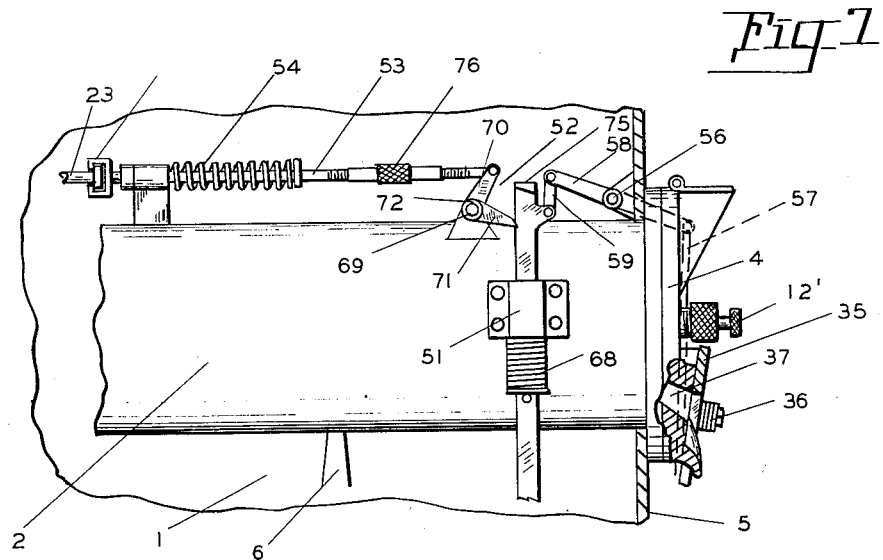
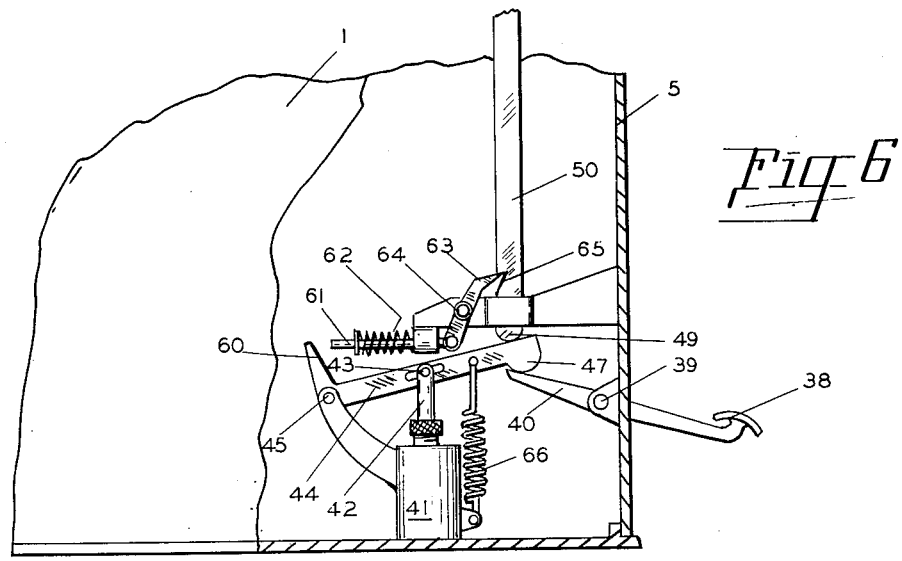
INVENTOR.
ANDREW J. TACCHELLA
ATTORNEY Patented May 23, 1950

2,508,435

UNITED STATES PATENT OFFICE 2,508,435

FREEZING MACHINE

Andrew J. Tacchella, Portland, Oreg., assignor to Steady Flow-Freezer Co., Portland, Oreg., a corporation of Oregon Application April 6, 1945, Serial No. 586,967

16 Claims. (Cl. 62—2)

1

This invention relates to freezing machines and more particularly to automatic freezing and dispensing machines.

The primary object of my invention is to provide a machine wherein fresh mix is supplied to the freezer simultaneously with the withdrawing or dispensing of the frozen cream. It is an object of the invention to provide a machine in which fresh mix will replace the finished product as it is being withdrawn from the freezer, and that the fresh mix will be so added to the freezer that it will be thoroughly mixed and frozen before it reaches the dispensing end of the freezer. This is accomplished by a special measuring valve located between the prepared mix and the freezing chamber. The valve is operated in connection with the mechanism for operating the discharge gate for dispensing the finished product. I further provide a means within the freezer for retarding the forward flow of the fresh mix towards the dispensing end of the freezer.

A still further object of my invention is to provide a machine including a mechanical operating device within the freezer cabinet for measuring the amount of frozen product being dispensed, at the same time measuring the amount of fresh mix being added to the freezer taking the place of the finished product having been dispensed.

Another object of my invention is to provide a machine for carrying out objects of the invention and having simplicity of design wherein all of the parts are readily accessible and easy to keep clean and sanitary.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 2 is a front view in perspective of the machine shown in Fig. 1.

Figure 3 is a fragmentary view partially in cross-section, of a measuring valve in measuring position.

Figure 4 is a fragmentary view, partially in cross-section, of the valve, shown in Fig. 3 in the dispensing position.

2

Figure 1:
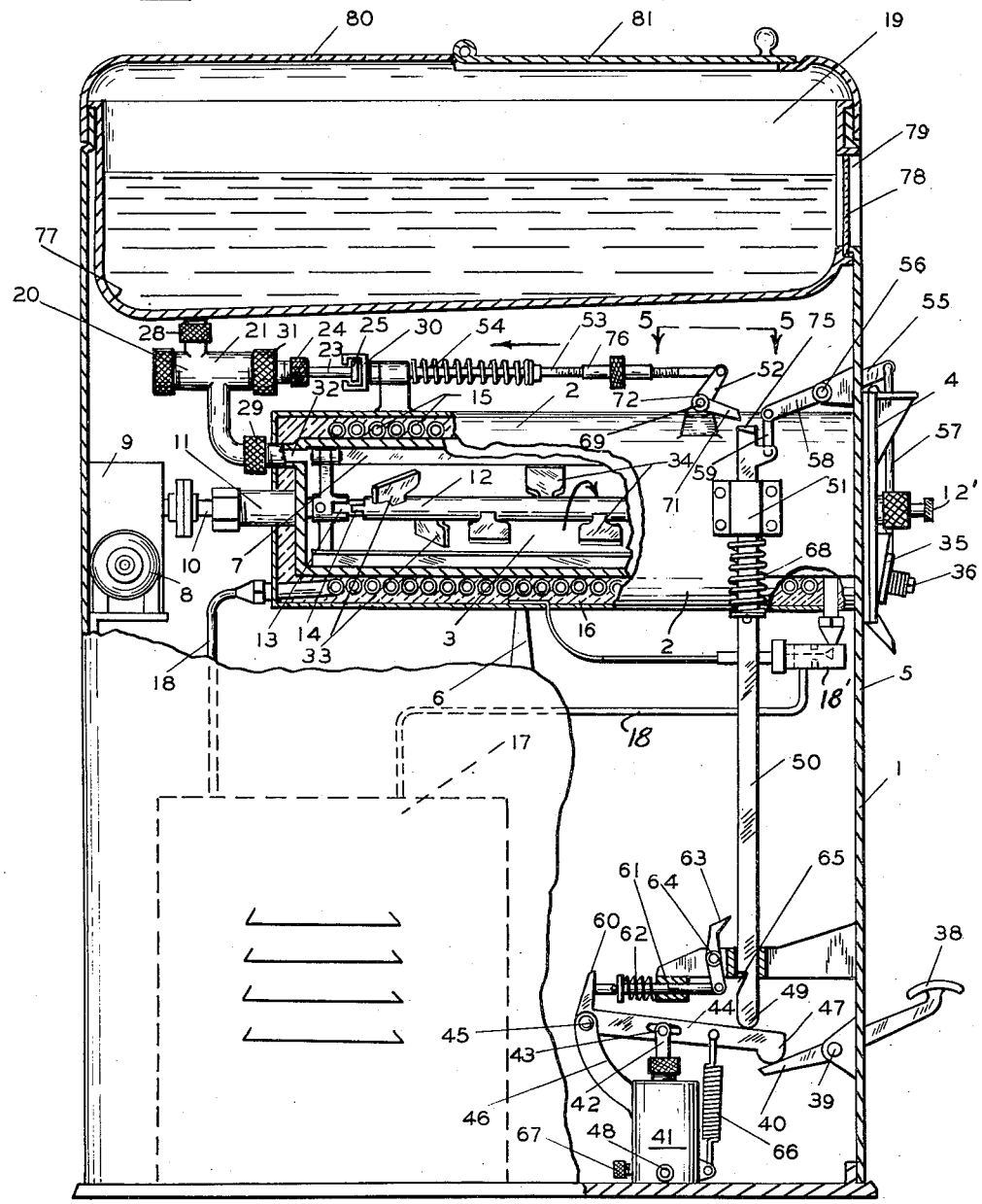
Figure 1 is a side view, partially in cross-section and partially in elevation of a freezing machine in accordance with the invention.

Figure 5 is a fragmentary cross-sectional view taken on line 5—5 of Figure 1, and showing a plan of part of the control mechanism.

Figure 6 is a fragmentary side view of the foot operating and dash pot arrangement after the foot pedal has been depressed.

Figure 7 is a fragmentary side view in elevation of the upper end of the push rod actuating the shut off gate and having actuated the mix measuring valve.

Referring now to the drawings, specifically to Fig. 1, a machine in accordance with the present invention, comprises a cabinet 1, having a freezing drum assembly 2 mounted therein. The freezing assembly or drum 2 consists of an inner cylinder 3 terminating in a flange 4, which is mounted to the front 5 of the cabinet 1 by any suitable means. The drum assembly may be further supported by the supporting pedestal 6.

A motor 8 and speed reducing device 9 drives the shaft 10 which is journalled in a suitable bearing 11. Scraping blade assembly 7 is fixedly mounted to and is revolved by the shaft 10. A beater rotor 12 is rotatably mounted on the shaft 10, and when shifted endwise of the shaft may be locked in engagement with the assembly 7 at 13 by the dog 14. This beater rotor can be thrown in and out of rotation by the knob 12'.

The usual freezing coils 15 surround the freezing cylinder 3 and have insulation 16 therearound. The coils 15 receive refrigerant from the refrigerant liquefying unit 17, indicated in dotted lines in Fig. 1, by way of the connections 18 and expansion valve or other suitable control means 18'. The freezing or evaporator-compressor apparatus may comprise any suitable and well known construction.

In addition to the freezing apparatus, a mix supply tank 19 is mounted within the upper part of the cabinet 1. I have provided a special measuring valve assembly 20 between the supply tank 19 and the mixing cylinder 3.

The measuring valve assembly 20, referring to Figures 3 and 4, comprises a cylinder 21, having a special piston 22 working therein. A piston rod 23 extends through the stuffing box 24 and terminates in a suitable cross head 25. In Figure 3 it will be noted that the piston does not cover the port 26 leading from the tank 19 and is covering the port 27 leading to the freezing cylinder 3. The mix will flow into the piston 22 and the cylinder 21 while in this position, but when the piston is moved to the position shown in Figure 4 the port 26 will be closed and the port 27 opened, at the same time the piston 22 will forcibly eject the mix from the valve assembly 20 into the freezing cylinder 3. I do not wish to be limited to this type of measuring device, but I have illustrated this system to carry out the object of my invention and further the measuring assembly 20 can be readily removed from the machine and cleaned. It is connected to the tank 19 by the well known gland nut 28 and to the mixing cylinder 3 by the nut 29. The cross head 25 works within the special yoke 30 of the operating mechanism, which will hereinafter be described. The piston 22 can be readily removed from the cylinder 21 by removing the gland nut 31.

When the mix enters the freezing cylinder 3 by way of the port 32, it is desirable to retard its flow to the opposite end of the freezing cylinder. This is accomplished by the mixing paddles 33 being inclined in a direction as to force the mix to the rear of the freezing cylinder 3, or to where it enters at 32. The object of course is to insure a complete mixing of the mix before it reaches the discharge end of the mixing and freezing chamber. I do not wish to be limited to the mechanical method which I have illustrated, as other equivalents may be used so long as it retards the flow forward of the mix. In the design of my freezing chamber I make the length of the same relatively long in comparison to its diameter to insure a more complete mixing and freezing of the product.

I have found in the dispensing of creams and the like that it is most desirable to have a controlled and measured dispensing of the product, therefore I have provided a mechanism for accomplishing the desired result. I use the well known shutter or cut off gate 35, which is pivotally mounted at 36 and covers the discharge opening 37, indicated in dotted position in Figure 2. Ordinarily this shutter is opened by hand, but I have provided a means of operating this shutter by the foot of the operator and controlling the duration of opening by a mechanism that I will now describe.

A foot pedal 38 is pivotally mounted at 39 and has a lever arm 40 extending within the cabinet. A dash pot 41 including a piston, not shown, and having a piston rod 42 is mounted within the cabinet, the piston rod 42 being pivotally connected at 43 to the lever 44, which in turn is pivotally mounted at 45 to the bracket arm 46 at its one end and having its other end 47 resting on top of the lever arm 40 of the foot pedal 38. The lower end 49 of a vertically positioned rod 50 is located above the end 47 of the lever 44. When the foot pedal is depressed it will raise the lever 44 by contacting the end 47, which also raises the piston within the dash pot cylinder 41 taking air in through the check valve 48 into the dash pot cylinder. When the lever 44 is raised, it contacts the end 49 of the push rod 50, raising the rod 50 through its guide 51, contacting the bell crank assembly 52, forcing the connecting rod 53 against the spring 54 towards the measuring valve assembly 20. The yoke 30, which forms part of the rod 53, is also pushed in the direction of the arrow, forcing the measuring valve piston 22 to the position shown in Figure 4, dispensing a measured amount of mix into the cylinder 3 by way of the port 32 as heretofore described.

When the push rod 50 is raised it also opens the dispensing gate 35. A crank arm 55 is fixedly mounted to the cross shaft 56 and is connected to the gate 35 by a suitable connecting rod 57. The cross shaft 56 has a crank arm 58 fixedly mounted thereto and connected to the push rod 50 by a connecting rod 59. As the push rod 50 is raised, it rocks the cranks 58 and 55 by the connecting rod 59, opening the gate 35 through the connecting rods 59 and 57. When the lever 44 is raised about its pivot point 45, a bell crank 60, forming part of the lever 44, frees the push rod 61 so that it may be forced to the left, as shown in Fig. 1, by the spring 62, pivoting the ratchet 63 about its center 64 to engage the notch 65 in the adjacent side of the push rod 50 when it is raised, best illustrated in Figure 6.

When the push rod 50 reaches the position illustrated in Figure 7, it has allowed the bell crank assembly 52 to return to the position illustrated in Figure 1, permitting the measuring valve assembly to be retracted and recharged, ready for another cycle of operation, but in the position shown in Figure 7 the push rod 50 is holding the shut off gate 35 in dispensing position due to the ratchet 63 engaging the notch 65, as shown in Fig. 6. When the foot pedal 38 is released the spring 66 returns the lever 44 to the starting position, shown in Figure 1.

An adjustable air relief valve 67 allows the piston within the dash pot 41 to return to starting position at a predetermined rate. When the bell crank 60 of the lever 44 again contacts the end of the push rod 61 it will disengage the ratchet 63, disengaging it from the notch 65, allowing the push rod 50 to be returned to starting position by the spring 68, thereby closing the gate 35. The period of time that the gate 35 is held open is determined by the adjustment of the relief valve 67 which controls the return movement of the dash pot piston and the operation of the lever 44, which causes the release of the push rod 50 as heretofore described.

Referring to Figure 5 the bell crank assembly 52 consists of a cross shaft 69 having a crank arm 70 fixedly mounted thereon to which the rod 53 is pivotally connected. On the opposite end of the shaft a ratchet arm 71 is loosely mounted to the shaft 69. The shaft having a pin 72 fixedly secured therein against which the shoulder 73 of the ratchet engages when it is raised by the push rod 50. A spring 74 maintains the ratchet arm 71 against this pin but permits the arm 71 to resiliently pivot about the shaft 69 away from the pin 72. The push rod 50 has a laterally extending lug 75 on its upper end that engages the end of ratchet arm 71 when the rod 50 is raised. The stroke of the rod 50 is greater than the arc of engagement between the arm 71 and the lug 75 so that the lug passes the arm during its upward movement. Therefore, the lug 75 of the push rod 50 must pass the end of the ratchet arm 71 on its return stroke and this is permitted by the spring 74. As the lug 75 is lowered, it engages and pivots the arm 71 against the action of the spring 74. During the lowering movement the spring 74 allows the ratchet arm 71 to revolve about the shaft 69, permitting the lug 75 to pass by the end of the ratchet. After the lug 75 passes the arm 71, the arm is biased back against the pin 72 by the spring 74, in operative position, as shown in Fig. 1. The amount of mix permitted to enter the freezing chamber may be determined by the adjusting nut or turnbuckle 76 being adjusted to change the length of the rod 53. When the machine has been in operation it is easy for the operator to determine the adjustment of the measure valve admitting the proper amount of mix for replacing the product dispensed.

The mix container 19 is of a design that may be easily cleaned, having rounded bottom corners 77. A transparent level indicating device 78 is located so that it can be observed through the opening 79 in the front of the cabinet. A removable top 80 covers the mix container 19 together with the cabinet 1 and is provided with an opening and a closure 81 therefor, giving access to the tank 19. I also provide in the side of the cabinet 1 a panel 82 permitting access to the interior of the cabinet for making adjustments and for disassembling the parts for cleaning.

I will now describe the operation of the machine. The operator pushes down on the pedal 38 which operates the push rod 50 as heretofore described, opening the dispensing gate 35 operating the bell crank assembly 52, which operates the measuring valve assembly 20, forcing in a predetermined amount of mix into the freezing chamber simultaneously with the product that is being dispensed through the gate 35. The gate 35 is held in open position for a predetermined length of time when it will be closed automatically by the mechanism having just been described.

I do not wish to be limited to the exact mechanical combinations herein described, as other mechanical equivalents may be substituted still coming within the scope of my claims.

I claim:

1. A machine for converting a somewhat liquid mix into a frozen product including a cabinet, a mix container in the cabinet, a freezing assembly in the cabinet, means for delivering the frozen product from one end of the freezing assembly, means for delivering the mix to the opposite end of the freezing assembly, mechanical means for controlling the delivery of the frozen product from the freezing assembly, and means automatically actuated in the operation of the mechanical means for delivering the mix to the freezing assembly during the delivery of the frozen mix, whereby a quantity of frozen mix delivery is replaced in the freezing assembly by a predetermined quantity of the mix to be frozen.

2. A construction as defined in claim 1 wherein the delivery of the mix is controlled by a measuring valve for delivering a predetermined quantity of the mix to the freezing assembly at each operation.

3. A construction as defined in claim 1 wherein the freezing assembly includes means for stirring the material being frozen and the freshly delivered mix, the said means being formed to retard the flow of the freshly delivered mix toward the delivery end of the freezing assembly.

4. A construction as defined in claim 1 wherein the mechanical means for operating the delivery of the frozen product from the freezing assembly and for automatically controlling the delivery from the mix container to the freezing assembly includes a delivery gate for the frozen mix, a member for operating the delivery of the mix from the container to the freezing assembly including a push bar, manual means for operating the push bar and connections between the push bar and the gate and between the push bar and the means for controlling the delivery of the mix to the freezing assembly.

5. A machine for freezing a mix and for delivering the frozen mix at will, including a cabinet, a container for the mix arranged at the upper portion of the cabinet, a freezing assembly arranged below the container and including a fixed elongated chamber, refrigerating means encircling the chamber, a delivery outlet at one end of the chamber, a mixer rotatably mounted in the chamber, a measuring valve between the container and chamber for delivery of a predetermined quantity of mix from the container to the chamber, a gate for controlling the outlet from the chamber and manually operable means for automatically operating the gate and simultaneously operating the valve.

6. A construction as defined in claim 5 wherein the rotatable mixer includes blades arranged to retard the flow of the mix toward the opposite end of the chamber.

7. A construction as defined in claim 5, wherein the valve includes a valve body, a plunger movable in the body and formed with an outlet communicating with the chamber, the body being formed with an inlet communicating with the container and open to the interior of the body in one position of the plunger, the plunger in inlet position opening the inlet from the container and closing the outlet from the chamber and in another position closing the inlet from the container and opening the outlet to the chamber.

8. A construction as defined in claim 5 wherein said manually operable means includes a push rod movable in one direction to open the gate and to simultaneously operate the valve to supply mix to the chamber, a movable bar underlying the rod, means for biasing said bar in one direction, means for retarding the biased movement of the bar in said one direction, a pedal for moving the bar in the opposite direction, means for automatically holding the rod in a position to maintain the gate open, and means on the bar for releasing the holding means simultaneously with cessation of the operation of the retarding means.

9. A freezing machine including a freezing chamber, a delivery gate for dispensing the frozen product from said chamber, a mix container arranged to deliver a quantity of mix from said container to the freezing chamber, gate operating means, means for controlling the delivery from the mix container, and means responsive to the operation of the gate operating means for simultaneously operating the mix delivery means.

10. A construction as defined in claim 9, wherein said gate operating means includes delayed action means for closing said gate to limit the delivery of frozen product from said chamber, and said mix delivery means includes means for delivering the mix from the container in any one delivery operation in proportion to replace the quantity of frozen product delivered through the gate in the simultaneous operation thereof.

11. A construction as defined in claim 9, wherein the gate operating means and mix delivery means is mechanically operated.

12. A construction as defined in claim 9, wherein the means for controlling the delivery of the mix from the mix container comprises a valve constructed to predetermine the quantity of mix delivered in any one operation.

13. A freezing machine including a freezing chamber to freeze a material therein for delivery at one end of the chamber, a mix container communicating with the freezing chamber, and means for controlling the mix delivery from the container to the freezing chamber simultaneously with and during the delivery of the frozen product from the freezing chamber.

14. A construction as defined in claim 13, wherein the quantity of mix delivered from the container to the chamber is in predetermined proportion to the quantity of the frozen product being delivered from the chamber in any one operation.

15. A freezing machine including a freezing chamber for freezing a product for delivery at one end of the chamber, and means for delivering a quantity of mix proportioned to the quantity of frozen product delivered from the chamber, the delivery of the mix being automatic during frozen product delivery.

16. A construction as defined in claim 15, wherein the delivery of the frozen product is mechanically controlled, and wherein the delivery of the mix is automatically governed in, and as a result of, such mechanical control.

ANDREW J. TACCHELLA.

No references cited.